United States Patent [19]

Coates et al.

[11] 3,978,023

[45] Aug. 31, 1976

[54] STABILIZATION OF POLYMERIC COMPOSITIONS

[75] Inventors: Harold Coates, Wombourne; Peter Albert Theodore Hoye; Anthony James Wilkins, both of Stourbridge, all of England

[73] Assignee: Albright & Wilson Limited, Oldbury, near Birmingham, England

[22] Filed: Feb. 4, 1972

[21] Appl. No.: 223,743

Related U.S. Application Data

[63] Continuation-in-part of Ser. No. 8,748, Feb. 4, 1970, abandoned.

[30] Foreign Application Priority Data

Feb. 4, 1969 United Kingdom ................ 5906/69

[52] U.S. Cl. ................ 260/45.75 S; 260/45.8 A; 260/45.7 P; 260/23 XA; 260/45.95 H; 252/401
[51] Int. Cl.² .......................................... C08J 3/20
[58] Field of Search ................ 260/45.75 K, 23 XA, 260/45.8 A, 45.7 P, 45.95 H; 252/401

[56] References Cited

UNITED STATES PATENTS

| | | | |
|---|---|---|---|
| 2,387,571 | 10/1945 | Fikentscher et al. | 260/45.7 |
| 2,746,946 | 5/1956 | Weinberg et al. | 260/45.75 |
| 2,914,506 | 11/1959 | Mack et al. | 260/45.75 |
| 3,021,302 | 2/1962 | Frey et al. | 260/45.75 |
| 3,056,824 | 10/1962 | Hecker et al. | 260/45.7 |
| 3,061,583 | 10/1962 | Huhn et al. | 260/45.7 |
| 3,264,256 | 8/1966 | Mack | 260/45.7 |
| 3,356,770 | 12/1967 | Larrison | 260/45.7 |
| 3,413,264 | 11/1968 | Hechenbleikner | 260/45.75 |
| 3,565,931 | 2/1971 | Brecker | 260/45.75 |

*Primary Examiner*—V. P. Hoke

[57] ABSTRACT

Halogenated vinyl resins such as poly(vinyl chloride) (P.V.C.) are stabilized against degradation by the addition of stabilizers comprising specified monoorganotin sulfur-containing compounds, for example the reaction product of a mono-organotin tris mercapto carboxylic acid ester and a di-organotin sulfide in combination with an alkyl, aryl or mixed alkyl-aryl ester of phosphorous acid. Preferably the stabilizers also include a hindered phenol.

12 Claims, No Drawings

STABILIZATION OF POLYMERIC COMPOSITIONS

This application is a continuation-in-part of application Ser. No. 8,748, filed Feb. 4, 1970 and now abandoned.

The present invention relates to halogenated polymeric compositions stabilized against the degradative effects of heat. When used herein the term "halogenated polymeric composition" means polymers or copolymers containing at least 25% by weight of vinyl and/or vinylidene halide and products obtained by post halogenation of such polymers.

Monoalkyltin compounds have been employed as stabilizers for poly(vinyl chloride) (P.V.C.) and similar resins; however, it has been preferable to employ diorganotin compounds, which in general exhibit a superior stabilizing effect.

It has now been found that an unexpected synergistic stabilizing effect, as demonstrated by improved color and prolonged resistance to color change, can be obtained for halogenated polymeric compositions by incorporating into them a mixture of particular monoalkyltin compounds and alkyl, aryl, or mixed alkyl-aryl esters of phosphorous acid, which are themselves quite widely used as secondary stabilizers in combination with various heat stabilizers for P.V.C. We have found that this synergistic effect is most pronounced for monoalkyltin compounds containing no tin-oxygen bonds, is very much less evident for the analagous di- or trialkyltin compounds, and appear to be absent for monoalkyltin compounds which do not contain a tin-sulfur bond.

SUMMARY OF THE INVENTION

The present invention provides halogenated polymer compositions wherein the stabilizer comprises (1) one or more organotin compounds exhibiting a general formula selected from the group consisting of

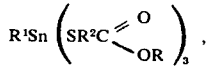

$(R^1SnS_{1.5})_n$, and

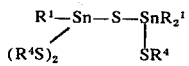

wherein $R^1$ and $R^3$ each represent an alkyl radical of from 3 to 18 carbon atoms, an aryl or an alkaryl radical, $R^2$ represents an alkylene hydrocarbon radical and $R^4$ represents the radical

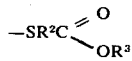

and (2) an alkyl, aryl, or mixed alkyl-aryl ester of phosphorous acid and $n$ is an integer between 2 and 5.

This invention also provides compositions suitable for stabilizing halogenated polymeric compositions, said compositions comprising (1) a monoorganotin compound as described hereinabove and (2) an alkyl, aryl, or a mixed alkyl-aryl ester of phosphorus acid.

DETAILED DESCRIPTION OF THE INVENTION

Halogenated polymers for which the stabilizers of the present invention are particularly suited include poly(vinyl chloride), poly(vinylidene chloride), post chlorinated products thereof, copolymers of vinyl chloride with vinylidene chloride or copolymers of either or both with acrylic and methacrylic acids, vinyl acetate, diesters of fumaric or maleic acids, ethylene and propylene. Such copolymers contain at least 25% by weight of vinyl chloride or vinylidene chloride.

Organotin compounds useful in the present invention are those having at least one monoorganotin group (i.e. compounds wherein at least one tin atom has only one tin-carbon bond), the tin atom of which is directly bonded to a sulfur atom. Suitable compounds are those having an

grouping. These include monalkyl thiostannoic anhydrides and their esters and condensation polymers. Preferred, however, are monoalkyltin tris mercaptocarboxylic acid esters, in particular, monoalkyltin tris alkyl thioglycollates, compounds of the formula

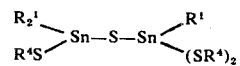

produced by the reaction of diorganotin sulfides with monoorganotin tris mercaptocarboxylic acid esters and mixtures of these sulfides with monoorganotin tris-mercaptocarboxylic acid esters. $R^1$ and $R^4$ represent a hydrocarbon radical and a residue of a mercaptocarboxylic acid ester, respectively as previously defined. Other organotin compounds may be present in the present compositions. For example, di- or trialkyltin mercaptocarboxylic acid esters may be present in admixture with the monoalkyltin compounds.

Among the monoalkyltin compounds which are particularly useful are butyl thiostannoic anhydride, octylthiostannoic anhydride, n-butyltin tris-iso-octylthioglycollate, n-octyltin tris-iso-octyl thioglycollate, monobutyltin iso-octylthioglycollate sulfide, i.e.

and the 2-ethylhexyl ester analogue, n-butyltin tris iso-octyl-β-mercaptopropionate, n-octyltin tris iso-octyl-β-mercaptopropionate, methyltin tris octylthioglycollate, phenyltin trisisooctyl thioglycollate. Preferred compounds of the formula

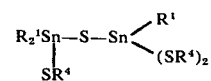

referred to above are the condensation product of dibutyltin sulfide with monobutyltin tris iso-octyl thioglycollate and of dioctyltin sulfide with octyltin tris iso-octyl thioglycollate. Other compounds which may be employed include cyclohexyltin tris-iso-octyl thioglycollate, n-butyltin tris-decyl thioglycollate, octyltin tris nonyl thioglycollate, cyclohexyl tin tris-iso-octyl thioglycollate and n-butyltin tris hexylthioglycollate, benzyltin tris iso-octyl thioglycollate.

Esters of phosphorous acid which may be employed in compositions according to the invention include polymeric phosphites such as hydrogenated 4,4'-isopropylidene diphenol diphosphite. Preferred phosphites are monomeric compounds having no substituents on the hydrocarbon radicals. These include triaryl, trialkyl, and mixed alkyl-aryl phosphites. Such compounds include, for example, triphenyl phosphite and trixylylphosphite. Suitable mixed alkyl-aryl phosphites include octyl diphenyl phosphite, isodecyl diphenyl phosphite and diisodecyl phenyl phosphite. Similar stabilization can also be obtained by employing a mixture of a triaryl phosphite and an aliphatic alcohol, preferably having from 8–20 carbon atoms, in conjunction with the organotin compound. A particularly suitable mixture is that of triphenyl phosphite and isodecanol.

We have further found that it is particularly beneficial if the compositions also contain a hindered phenol as secondary antioxidant. Such hindered phenols contain an alkyl group in both positions ortho to the hydroxyl group and are frequently present in amounts of from 0.05–0.15 of the total composition. Suitable compounds include 2,6-dimethylphenol 2,6-di-t-butylphenol, bisphenols such as 2,2'-bismethylene 6,6'-dimethyl phenol. Particularly preferred, however, is 2,6-di-ti-butyl-p-cresol, available under the tradename "Topanol O"

The stabilizer compositions of this invention are particularly useful when employed in polymer compositions containing an epoxy compound, which serves to delay the initial discoloration of the resin composition. Epoxy compounds which may be employed in such compositions include esters of epoxidized oleic acid and compounds of the formula

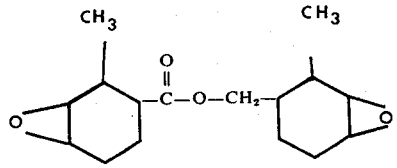

The organotin compounds will normally be present in compositions of the invention in amounts of from 1–5%, preferably from 2–3% by weight based on the weight of halogenated polymer and the esters of phosphorous acid in amounts of from 2–10% by weight, preferably from 4–6% by weight on the same basis. We have found that it is particularly desirable to employ from 1.0–2.5 moles of phosphite for each mole of monoalkyltin compound.

In the practice of the invention the stabilizer system can be mixed with the halogenated polymeric compositions in conventional manner, for example, by milling with the resin on heated rolls at about 150°C., although higher temperatures may be used when convenient, or by being mixed with particles of the polymer and then melting and extruding the mixture or by adding the stabilizer to a liquid resin.

The stabilizer systems of the present invention can be employed in plasticized resin compositions, for example, those plasticized with carboxylate ester plasticizers such as dioctyl phthalate and butyl benzyl phthalate or triaryl phosphate plasticizers (such as those derived from phenols obtained synthetically or from coal tar) or may be employed in unplasticized, that is rigid, compositions.

Compositions according to the invention are illustrated by the following Examples in which all parts are by weight unless otherwise stated.

EXAMPLE 1

Effect of Phosphite Combined With Mono and Dibutyltin Compound Compared with Respect to Equal Tin Contents The stabilizer (compound mixture and quantity as in the table that follows) was milled at 150°C. for 10 minutes with 100 parts of Corvic D55/9 poly(vinyl chloride). Portions of the resulting sheet were oven aged in air at 200°C. The heating time and color of the test samples are indicated in the table.

| STABILIZER | PARTS BY WEIGHT | MINUTES AT 200°C. | | | | COLOR | | |
|---|---|---|---|---|---|---|---|---|
| | | 0 | 15 | 20 | 25 | 27½ | 30 | 32½ |
| Butyltin tris(isooctyl thioglycollate) | 1.9 | C | C | v pale brown | v pale brown | v pale brown | pale green | green |
| Topanol O | 0.1 | | | | | | | |
| Butyltin tris(isooctyl thioglycollate) | 1.9 | C | C | C | C | C | v pale yellow | black |
| Topanol O | 0.1 | | | | | | | |
| Diisodecylphenyl phosphite | 2.13 | | | | | | | |
| Dibutyltin bis(isooctyl thioglycollate) | 1.54 | v pale yellow | yellow | yellow | dark yellow | dark yellow | orange yellow | dark red |
| Topanol O | 0.08 | | | | | | | |
| Dibutyltin bis(isooctyl thioglycollate) | 1.54 | v pale yellow | pale yellow | pale yellow | yellow | yellow | dark yellow | orange yellow |
| Topanol O | 0.08 | | | | | | | |
| Diisodecylphenyl phosphite | 2.13 | | | | | | | |

NOTE:
Topanol O = 2,6-di-t-butyl-p-cresol  C = Colorless

EXAMPLE 2

Effect of Tertiary Phosphite and Secondary Phosphite With Monobutyltins

The stabilizer compositions shown in the following table were milled with 100 parts Corvis D55/9 polyvinyl chloride as described in Example 1 and tested in a similar manner.

| STABILIZER | PARTS BY WEIGHT | MINUTES AT 200°C. | | | | | |
|---|---|---|---|---|---|---|---|
| | | 0 | 15 | 20 | 25 | 27½ | 30 | 32½ |

| STABILIZER | PARTS BY WEIGHT | 0 | 15 | 20 | 25 | 27½ | 30 | 32½ |
|---|---|---|---|---|---|---|---|---|
| Butyltin tris(isooctyl thioglycollate) | 1.9 | C | C | v pale brown | pale brown | pale brown | yellow brown | black |
| Topanol O | 0.1 | | | | | | | |
| Butyltin tris(isooctyl thioglycollate) | 1.9 | C | C | C | C | C | v pale yellow | yellow |
| Topanol O | 0.1 | | | | | | | |
| Diisodecylphenyl phosphite | 2.67 | | | | | | | |
| Butyltin tris(isooctyl thioglycollate) | 1.9 | C | C | v pale yellow | v pale yellow | pale yellow | pale yellow | yellow |
| Topanol O | 0.1 | | | | | | | |
| Diisopropyl phosphite | 0.2 | | | | | | | |

EXAMPLE 3

Comparison With and Without Phosphite and Epoxy at Equivalent Tin Content

Test compositions were prepared as in Example 1 and tested in a similar manner. The results of the tests are shown below.

| STABILIZER | PARTS BY WEIGHT | 0 | 15 | 20 | 25 | 30 | 35 |
|---|---|---|---|---|---|---|---|
| Dibutyltin bis(isooctyl thioglycollate) | 2.0 | C | pale yellow | yellow | yellow | dark green | orange yellow |
| Stabilizer A (see below) | 1.73 | C | C | v pale brown | pale brown | brown | dark brown |
| Stabilizer A | 1.73 | | | | | | |
| Diisodecylphenyl phosphite | 0.336 | C | C | C | v pale yellow | pale brown | pale brown |
| Paraplex G 62 (an epoxidized ester of oleic acid) | 0.336 | | | | | | |
| Butyltin tris(isooctyl thioglycollate) | 2.423 | | | | | | |
| Topanol O (2,6-di-tert-butyl p-cresol) | 0.127 | C | C | C | v pale brown | v pale yellow | pale yellow |
| Diisodecylphenyl phosphite | 0.535 | | | | | | |

NOTE:
Stabilizer A is an equimolar mixture of monobutyltin trisisooctyl thioglycollate and dibutyltin sulphide plus 5% wt. of Topanol O in the mixture.

EXAMPLE 4

Octyl Thiostannoic Anhydride With Phosphite, Molar Ratio 1:2

Test compositions were prepared as in Example 1 and tested as shown below.

| STABILIZER | PARTS BY WEIGHT | 0 | 10 | 15 | 20 | 22½ |
|---|---|---|---|---|---|---|
| Octyl thiostannoic anhydride | 1.0 | pale brown | pale brown | very dark brown | | |
| Octyl thiostannoic anhydride | 1.0 | C | C | C almost | pale yellow | black |
| Diisodecyl phenyl phosphite | 3.52 | | | | | |

EXAMPLE 5

Effect of Phosphites with Octyltin Stabilizers Tested at Equivalent Tin Content Test compositions were prepared as in Example 1 and tested as shown below.

| STABILIZER | PARTS BY WEIGHT | 0 | 10 | 15 | 20 | 25 | 30 | 32½ |
|---|---|---|---|---|---|---|---|---|
| Di-n-octyltin bis(iso- | | | pale | yellow | yellow | dark | | |

-continued

| STABILIZER | PARTS BY WEIGHT | MINUTES AT 200°C. | | | | | COLOR | |
|---|---|---|---|---|---|---|---|---|
| | | 0 | 10 | 15 | 20 | 25 | 30 | 32½ |
| octyl thioglycollate) | 2 | C | yellow | | | | yellow | black |
| Stabilizer B (see below) | 1.69 | C | C | v pale yellow | pale brown | pale brown | brown | brown |
| Stabilizer B | 1.69 | C | C | C | very pale yellow | very pale yellow | pale yellow | dark green |
| Diisodecylphenyl phosphite | 0.336 | | | | | | | |
| Paraplex G 62 | 0.336 | | | | | | | |
| Monooctyltin tris(iso-octyl thioglycollate) | 2.0 | C | — | v pale brown | pale brown | pale brown | pale green | — |
| Monooctyltin tris(isooctyl thioglycollate)(95%) plus Topanol O (5%) | 2.34 | C | C | C | C | v pale yellow | pale yellow | dark green |
| Diisodecylphenyl phosphite | 0.535 | | | | | | | |
| Monooctyltin tris(iso-octyl thioglycollate | 2.0 | C | — | C | C | C | v pale yellow | |
| Diisodecylphenyl phosphite | 2.35 | | | | | | | |
| Stabilizer B | 2.0 | C | — | C | C | C | v pale yellow | pale yellow |
| Diisodecylphenyl phosphite | 1.62 | | | | | | | |

NOTE:
Stabilizer B is an equimolar mixture of dioctyltin sulphide and monooctyltin trisisooctyl thioglycollate plus 5% by weight of Topanol O.

EXAMPLE 6

Use of Triphenyl Phosphite - Isodecanol Mixture in Place of Diisodecyl Phenyl Phosphite Test compositions were prepared as in Example 1 and tested as shown below.

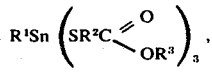

$(R^1SnS_{1.5})_n$,

| STABILIZER | PARTS | MINUTES AT 200°C. | | | | | COLOR | |
|---|---|---|---|---|---|---|---|---|
| | | 0 | 15 | 20 | 25 | 30 | 35 | 40 |
| Stabilizer A | 2 | C | C | C | C | v pale yellow | pale yellow | brown |
| Diisodecylphenyl phosphite | 1.88 | | | | | | | |
| Stabilizer A | 2 | C | pale yellow | pale yellow | yellow | yellow | orange | orange |
| Triphenyl phosphite | 1.88 | | | | | | | |
| Stabilizer A | 2 | C | C | C | v pale yellow | pale yellow | pale yellow | yellowish brown |
| Triphenyl phosphite | 1.18 | | | | | | | |
| Isodecanol | 1.42 | | | | | | | |

NOTE:
The composition of stabilizer A is the same as in Example 3.

EXAMPLE 7

Use of Butyl Thiostannoic Anhydride and with Diisodecyl Phenyl Phosphite

The compositions were prepared as described in Example 1 and tested with the following results.

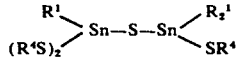

or physical mixtures of

| STABILIZER | PARTS BY WEIGHT | MINUTES AT 200°C. | | | | COLOR | |
|---|---|---|---|---|---|---|---|
| | | 0 | 5 | 10 | 15 | 20 | 22½ |
| butyl thiostannoic anhydride | 1.0 | Pale Brown | Pale Brown | Brown | Very dark Brown | almost black | — |
| butyl thiostannoic anhydride plus | 1.0 | C | C | C | Pale yellow | Dark yellow | Brown |
| diisodecyl phenyl phosphite | 3.5 | | | | | | |

We claim:
1. A stabilized polymer composition wherein the polymer is selected from homopolymers of vinyl chloride and vinylidene chloride and copolymers wherein the major component is vinyl chloride, vinylidene chloride or mixtures thereof, and the stabilizer comprises (1) between 1 and 5%, based on the weight of said polymer, of an organotin compound exhibiting a general formula selected from the group consisting of

and a compound of formula $R_2^3SnS$, wherein $R^1$ and $R^3$ are individually selected from alkyl radicals containing between 3 and 18 carbon atoms, aryl and alkaryl radicals, $R^2$ represents an alkylene hydrocarbon radical containing up to 8 carbon atoms, $R^4$ represents the radical

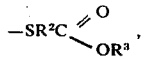

$n$ is an integer between 2 and 5 and (2) between 2 and 10%, based on the weight of said polymer, of a mixed alkyl-aryl triester of phosphorous acid, the molar ratio of said mixed alkyl-aryl triester to said organotin compounds being between 1.0:1 and 2.5:1.

2. A stabilized polymer composition as described in claim 1 wherein the organotin compound is selected from monoalkyl thiostannoic anhydrides and condensation polymers thereof.

3. A stabilized composition as described in claim 1 wherein there is present a hindered phenol exhibiting an alkyl radical on each of the two carbon atoms which are bonded to the carbon atom bearing the hydroxyl radical.

4. A stabilized composition as described in claim 1 wherein there is also present an epoxy compound.

5. A stabilized composition as described in claim 1 wherein the organotin compound is present in an amount between about 2 and 3% by weight of the halogenated polymer.

6. A stabilized composition as described in claim 1 wherein one or more esters of phosphorous acid are present in a total amount of between 4–6% by weight of the halogenated polymer.

7. A stabilized polymer composition as described in claim 1 wherein the organotin compounds are a physical mixture of a dialkyltin sulfide and a monoalkyltin tris(mercaptocarboxylic acid ester).

8. A stabilizer composition as described in claim 7 wherein the organotin compounds comprise a physical mixture of a dialkyltin sulfide and a monoalkyltin tris(mercaptocarboxylic acid ester).

9. A stabilizer composition suitable for stabilizing halogenated polymeric compositions which comprises (1) an organotin compound exhibiting a general formula selected from the group consisting of

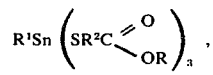

$(R^1SnS_{1.5})_n$,

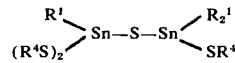

or physical mixtures of

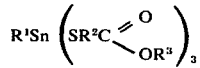

and a compound of the formula $R_2^3SnS$, wherein $R^1$ and $R^3$ are individually selected from alkyl radicals containing between 3 and 18 carbon atoms, aryl and alkaryl radicals, $R^2$ represents an alkylene hydrocarbon radical containing up to 8 carbon atoms, $R^4$ represents the radical

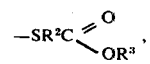

$n$ is an integer between 2 and 5 and (2) a mixed triester of phosphorous acid, the molar ratio of said mixed alkyl-aryl triester to said organotin compound being between 1.0:1 and 2.5:1.

10. A stabilizer composition as described in claim 9 wherein the organotin compound is a monoalkyl thiostannoic anhydride or an or condensation polymer thereof.

11. A stabilizer composition as described in claim 9 wherein there is incorporated a hindered phenol exhibiting an alkyl radical on each of the two carbon atoms which are bonded to the carbon atom bearing the hydroxyl radical.

12. A stabilizer composition as described in claim 9 wherein there is incorporated an epoxy compound.

* * * * *